United States Patent
Kuhlman, III et al.

(10) Patent No.: US 12,442,845 B2
(45) Date of Patent: Oct. 14, 2025

(54) METHOD OF GENERATING METADATA FROM ACQUIRED SIGNALS FOR SEARCH, FILTERING, AND MACHINE LEARNING INPUTS

(71) Applicant: Initial State Technologies, Inc., Nashville, TN (US)

(72) Inventors: Frederick B. Kuhlman, III, Nashville, TN (US); Adam M. Reeves, Nashville, TN (US); Thomas Buida, Nashville, TN (US); Gary J. Waldo, Hillsboro, OR (US); Keith D. Rule, Beaverton, OR (US); James R. Bailey, Brentwood, TN (US); Mitchell Parsons, Franklin, TN (US)

(73) Assignee: TEKTRONIX, INC., Beaverton, OR (US)

( * ) Notice: Subject to any disclaimer, the term of this patent is extended or adjusted under 35 U.S.C. 154(b) by 459 days.

(21) Appl. No.: 17/592,998

(22) Filed: Feb. 4, 2022

(65) Prior Publication Data
US 2022/0252647 A1    Aug. 11, 2022

Related U.S. Application Data

(60) Provisional application No. 63/147,153, filed on Feb. 8, 2021.

(51) Int. Cl.
*G01R 23/16* (2006.01)
*G06N 5/022* (2023.01)

(52) U.S. Cl.
CPC ............. *G01R 23/16* (2013.01); *G06N 5/022* (2013.01)

(58) Field of Classification Search
CPC ...... G01R 13/029; G01R 23/16; G06N 5/022; G06N 20/00
USPC .......................................................... 702/66
See application file for complete search history.

(56) References Cited

U.S. PATENT DOCUMENTS

| | | | |
|---|---|---|---|
| 11,461,683 B2* | 10/2022 | Thomas | G06V 10/772 |
| 2020/0166546 A1* | 5/2020 | O'Brien | G01R 13/029 |
| 2020/0358683 A1* | 11/2020 | Huang | H04L 41/0681 |

OTHER PUBLICATIONS

Kadowaki et al., JP 6798905 B2, "Abnormal Index Calculation Device, Abnormal Index Calculation Method and Abnormal Index Calculation Program", Date published: Dec. 9, 2020 (Year: 2020).*

* cited by examiner

*Primary Examiner* — John H Le
(74) *Attorney, Agent, or Firm* — Miller Nash LLP; Krista Y. Chan

(57) ABSTRACT

A computing device includes a port to allow the computing device to connect to a network, and one or more processors, the one or more processors configured to execute code to cause the one or more processors to determine that a new waveform has been added to a repository connected to the computing device, perform a set of measurements on the new waveform, attach results from the measurements to the new waveform as metadata, and store the new waveform and attached metadata to the repository. A method of managing waveform data includes determining that a new waveform has been added to a repository, performing a set of measurements on the new waveform, attaching results from the measurements to the new waveform as metadata, and storing the new waveform and attached metadata to the repository.

19 Claims, 3 Drawing Sheets

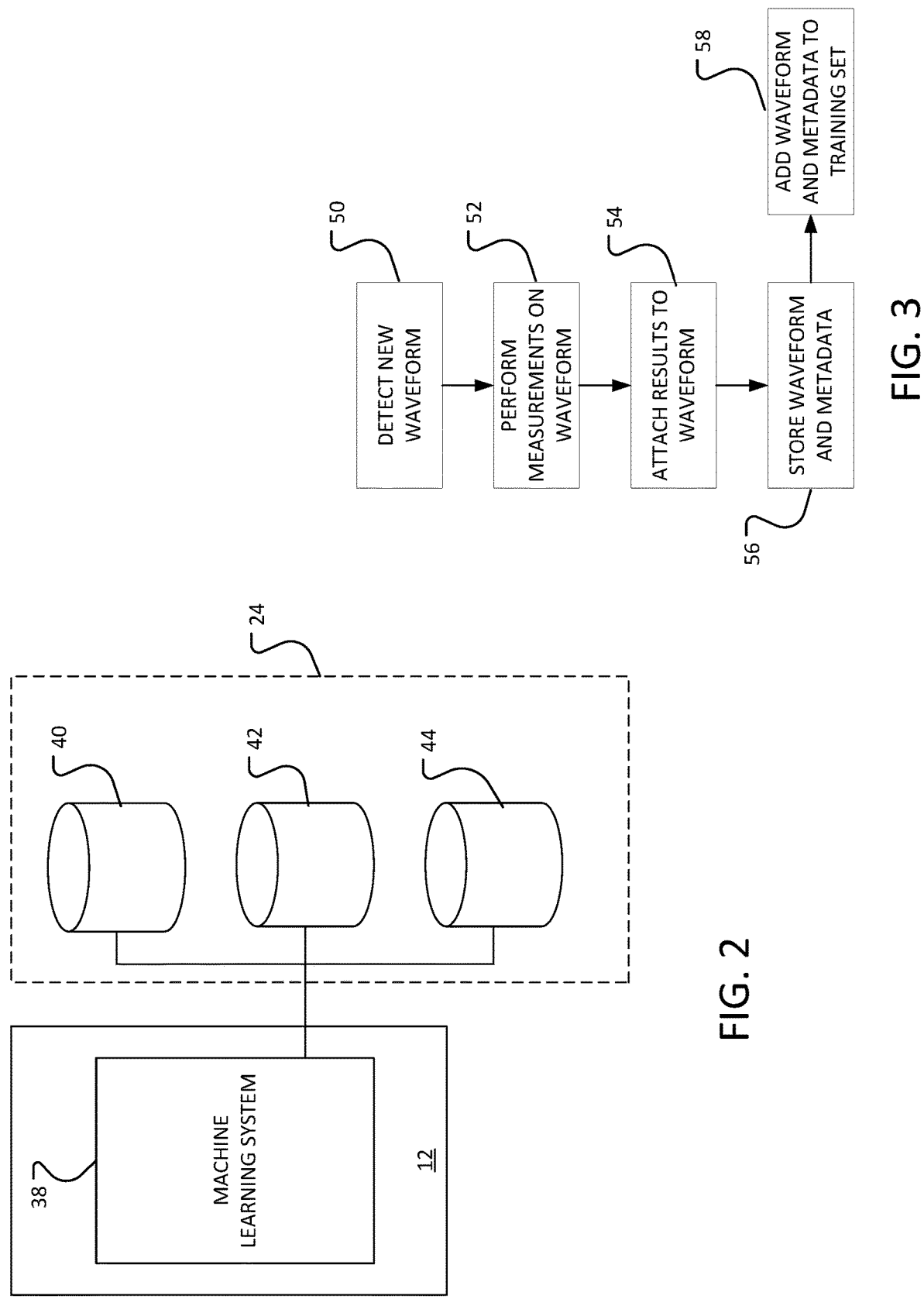

METHOD OF GENERATING METADATA FROM ACQUIRED SIGNALS FOR SEARCH, FILTERING, AND MACHINE LEARNING INPUTS

RELATED APPLICATIONS

This disclosure claims benefit of U.S. Provisional Patent Application 63/147,153, "METHOD OF GENERATING METADATA FROM ACQUIRED SIGNALS FOR SEARCH, FILTERING AND MACHINE LEARNING INPUTS" filed Feb. 8, 2021, which is incorporated herein in its entirety.

TECHNICAL FIELD

This disclosure relates to test and measurement systems, and more particularly to automatic generation of metadata from acquired signals.

BACKGROUND

Engineers take measurements on test and measurement equipment to distill acquired data into tangible information. The waveform and engineering data has information buried in it, but it is difficult to extract. Unlike searching text using text, where computers can handle the data format being the same as the search format, humans must use text and context to search and understand waveform and engineering data.

This poses a challenge as the waveform data must be abstracted to something tangible for the system to efficiently translate a human requirement to a waveform feature or measurement. In addition, engineers often need to know what measurements or inspections are needed to solve a particular problem at acquisition time. This results in extracting from the acquired data only the particular information needed to solve the particular problem, rather than other information that they may need later as understanding changes later in the debug/design cycle.

As an example, assume a user wants to sort ten waveforms from smallest to largest root-mean-square (RMS) value, a common measurement performed on the test and measurement device such as an oscilloscope. If all of the files included that measurement, the desired sort would be a simple operation. However, suppose that the engineers that acquired the candidate waveforms only happened to take an RMS measurement in five of the stored waveforms. In one solution, the system could open each of the file and perform the missing RMS measurements, then execute the sort. However, these files tend to be large, and the time to open, measure, and then save the RMS measurements for the files would take long periods of time, making it not scalable for multiple files.

Embodiments of the disclosed apparatus and methods address shortcomings in the prior art.

BRIEF DESCRIPTION OF THE DRAWINGS

FIG. 2 shows a machine learning component of a system to gather, analyze and store waveform metadata.

FIG. 3 shows a flowchart of a method of capturing waveform data and metadata.

DETAILED DESCRIPTION

The embodiments involve attaching measurements to the waveform files as metadata. The challenge exists in determining which measurements to include and how to include them to make the system as useful as possible. The embodiments create a library of measurements, classifications, decodes, and other algorithms, all of which can be run against the data sets whenever new data is added. As used here, the term "measurements" means any measurement, query, search, filter, classification, decode, etc. that is run against the data. In addition to the library of measurements, the system may implement methods to automatically crawl historical data already in the repository. The library can also be updated when new measurements are run to add them to the library.

The embodiments also provide for an expansion of the uses of the data. The term "data" as used here means the waveform data acquired from test and measurement devices and may include data points, images, etc. The term "metadata" as used here means any other information attached to the waveform data that may not actually include data from the test and measurement device. This may include administrative information, such as the name of the person running the test, their contact information, the date and time of the test, the description of the device under test that produced the waveform, including its serial number. In the embodiments here the metadata may also include the measurements taken of the data, the results of those measurements, etc.

For example, in the example given above, where the user wants to sort 10 waveforms from smallest to largest RMS value, these measurements would have been taken on the data when it was added to the repository. This would enable the user to perform the sort as the waveform data would have that information readily available.

A better solution to our example is to assure the RMS measurement is always attached to every file in the system using an automated process to crawl the data coupled with the practically unlimited compute resources of modern cloud environments.

Figure 1:
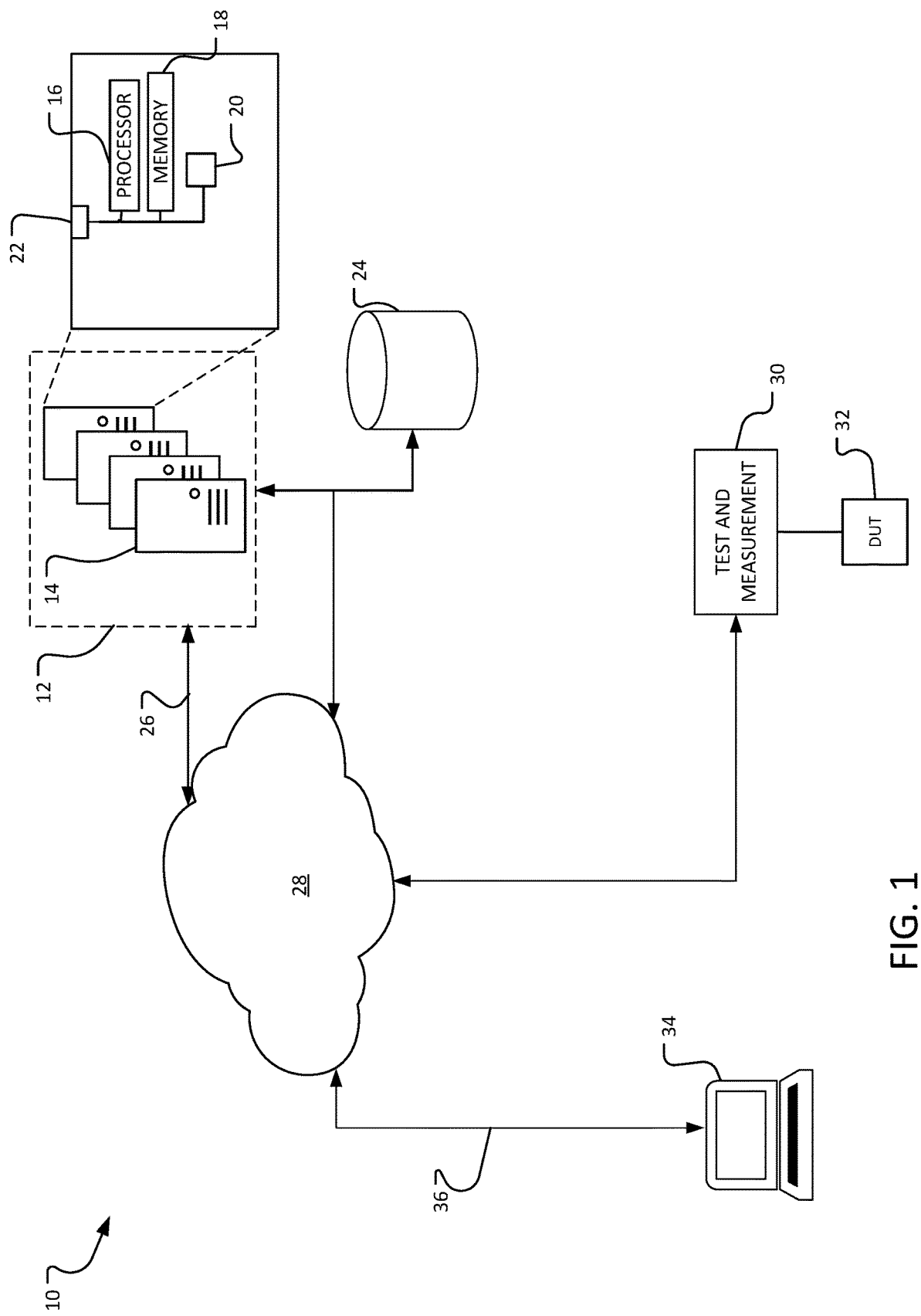
FIG. 1 shows a system to gather, analyze and store waveform data and associated metadata.

FIG. 1 shows an embodiment of a system 10 that provides these capabilities to the users. The system includes a computing device, 12, which may actually comprise a "cloud" of multiple computing devices such as 14. Each computing device 14 may have one or more processors 16, memory 18, a user interface 20 and a port 22 that allows the device to connect to other assets through a connection 26 to a network 28. The connection 26 may comprise a connection through the internet, an intranet, a virtual private network, or even a direct connection. Similarly, a repository 24 may be directly connected to the computing device 12, be a part of the computing device 12, or be connected through the network 28.

As mentioned above, the computing device and repository receives the waveform data from a test and measurement device such as 30. The test and measurement device performs tests on the device under test (DUT) 32 that results in the waveform data used in the system. As will be discussed in more detail later, a user may use a user device 34, connected to the network 28 through connection 36, to access the repository 24 either directly or through the computing device 12. The user device 34 may comprise a computing device such as a desktop or laptop computer, tablet, mobile phone, augmented reality (AR) or virtual reality (VR) headset, or any other computing device that allows the user to access the repository and/or send signals to the computing device 12 through the network 28. The user device 34 may include a display for presenting results returned by the computing device 12 to the user.

As shown in FIG. 2, the computing device 12 may include one or more processors that are programmed as a machine learning system 38. The term "machine learning system" as used here means a system that can operate in an autonomous manner and learns and improves from experience without being explicitly programmed. The programming mentioned above refers to the programming of the processor to form the machine learning system. The machine learning system will gain experience by consuming particular data sets, referred to here as training sets. The embodiments of the system may involve supplementing training sets by identifying new data sets, discussed in more detail below. Similar to what was discussed above regarding the distributed computing device, the repository 24 may comprise multiple repositories, partitions of a single repository, etc. One repository 40 may include the library of measurements mentioned above. Another repository 42 may contain the actual data and metadata. Another repository 44 may include the library of training data sets.

The embodiments populate the repository initially with historical data. The historical data may eventually undergo all the measurements applied in the system, such as in times when the system is not otherwise busy. Regarding new data, FIG. 3 shows a method of adding new data. At 50, the computing device, using one or more processors, determines that the repository had added a new waveform. This may occur through a notification from the repository, or an inquiry to the repository. The one or more processors then perform a set of measurements on the waveform at 52.

The set of measurements performed may include different measurements. An example may include all possible and practical measurements, since the system has no or very little knowledge about what measurements need to be performed. Another example may perform a user-definable set of measurements, such as a user selecting to run power ripple measurements defined by user.

Another example includes performing a defined set of the measurements, based on an initial assessment of the signal. The system decides to automatically run, for example, power ripple measurements based on characteristics of the incoming signal. The characteristics of the signal may be determined by an initial assessment. The assessment may be based on one or all of classification performed by the machine learning system, pattern recognition, measurement results, user-defined characteristics, and tagging/metadata added during acquisition. An example of measurement results may be that if a center frequency is measured to be 915 MHz, then run all Z-Wave measurements. User-defined characteristics may comprise something like, if the data contains 200 data points, or if the average amplitude is greater than 3 Volts, etc. An example enabled by the system would involve tagging/metadata added during acquisition, such as time/date, operator name, user-added tag like "USB," etc. Yet another example could be based upon the states of other systems, such as "run certain measurements based on health reports of other systems in the lab."

Returning to FIG. 3, once the system performs the measurements on the waveform at 52, the results are attached to the waveform data at 54. This is then stored in the repository at 56. As mentioned above, the data may be added to the training dataset for future updates to the machine learning system at 58. This determination may result from comparing the new data to existing data to determine that the existing data does not have those attributes and therefore adds it to the training set. In another analysis, the machine learning system may have an error vector and the data set may be selected to improve the error vector.

Figure 4:
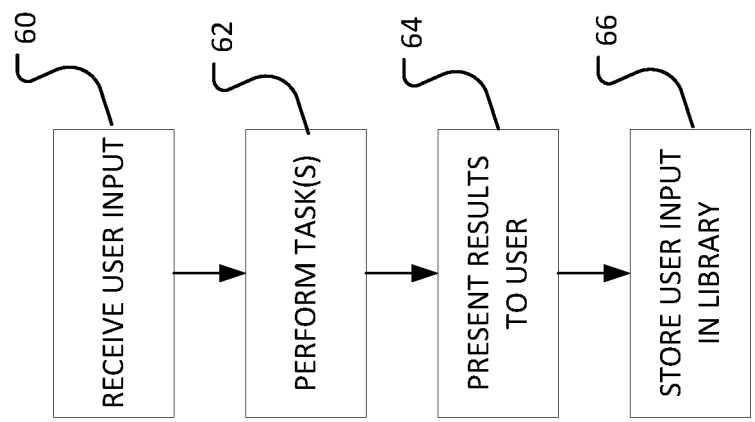
FIG. 4 shows a flowchart of a method of analyzing waveform data and metadata.

With the existence of this system, one can expand the addressable use cases of automatic metadata creation. FIG. 4 shows an embodiment of a method of using the system. At 60, the computing device receives a user input through the user device shown in FIG. 1. The user input submits a request to perform a task at 62 to the computing device, and the task may take one of many forms. Searching allows application of new searches to existing data, such as "find I2C decodes with address=x40h." Each measurement or algorithm can create structured data like numeric and string, which have sortable characteristics, such as the waveform searches by RMS value ascending. When distilling waveforms into measurements one can write complex filters for searching and automation, such as "show digital waveforms with rising edges between 100 µs and 1 ms."

Using the machine learning, or otherwise, the system can classify waveforms and measurements into types that are highly searchable and human readable, such as "show all the CAN bus captures." The user can create notifications from metadata/measurements, such as "when the process finds xAF, xFF, x16, x45 on a RS-232 signal, send the user an email and a link." The user can also ask the system to detect certain things, features, trends, thresholds, errors, etc. such as "show all the runts detected."

One strength of machine learning systems lies in their abilities to make predictions. The machine learning system can make predictions about future measurements, such as "show all waveforms that indicate 95% failure probability."

The computing device then presents the results to the user at 64. The user input, such as a search or query discussed above, may then be saved to the library of measurements, etc., in the repository at 66.

In this manner, one can collect and aggregate new metadata on an on-going basis when new measurements or capabilities are added to the system. One can also collect and aggregate new metadata on new data that enters the system, allowing searches and other tasks to be updated with the new data.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

EXAMPLES

Illustrative examples of the disclosed technologies are provided below. An embodiment of the technologies may include one or more, and any combination of, the examples described below.

Example 1 is a computing device, comprising: a port to allow the computing device to connect to a network; and one or more processors, the one or more processors configured to execute code to cause the one or more processors to: determine that a new waveform has been added to a repository connected to the computing device; perform a set of measurements on the new waveform; attach results from the measurements to the new waveform as metadata; and store the new waveform and attached metadata to the repository.

Example 2 is the computing device of Example 1, wherein the one or more processors are further configured to execute code to cause the one or more processors to: receive a new set of measurements across the network from a user device; and add the new set of measurements to the repository.

Example 3 is the computing device of Examples 2, wherein the one or more processors are further configured to execute code to cause the one or more processors to: perform the new set of measurements on existing waveforms in the repository; and add results from the new set of measurements to metadata attached to each waveform.

Example 4 is the computing device of any of Examples 1 through 3, wherein the one or more processors are further configured to execute code to cause the one or more processors to: receive signals from a user device; perform at least one task indicated by the signals; and provide results of the task to the user device.

Example 5 is the computing device of Example 4, wherein the at least one task comprises one or more of searching, sorting, filtering, classifying, triggering, detecting, and predicting.

Example 6 is the computing device of any of Examples 1 through 5, wherein at least one of the one or more processors is configured as part of a machine learning system.

Example 7 is the computing device of Example 6, wherein the machine learning system is configured to classify waveforms in the repository into types of waveforms.

Example 8 is the computing device of Example 6, wherein the machine learning system is configured to provide predictions about future measurements.

Example 9 is the computing device of any of Examples 1 through 8, wherein the code to cause the one or more processors to perform a set of measurements comprises code to cause the one or more processors to perform one or more of: all available measurements; a user-definable set of measurements; and a defined set of measurements after an initial assessment.

Example 10 is the computing device of Example 9, wherein the code to cause the one or more processors to perform an initial assessment comprises code to cause the one or more processors to perform at least one of: operating a machine learning process to produce a classification; performing pattern recognition; and basing the initial assessment on one of measurement results, user-defined characteristics, and metadata attached to the waveform.

Example 11 is the computing device of any of Examples 1 through 10, wherein the computing device is connected to one or more test and measurement devices.

Example 12 is the computing device of any of Examples 1 through 11, wherein the computing device comprises multiple computing devices and the one or more processors are distributed among the multiple computing devices.

Example 13 is a method of managing waveform data, comprising: determining that a new waveform has been added to a repository; performing a set of measurements on the new waveform; attaching results from the measurements to the new waveform as metadata; and storing the new waveform and attached metadata to the repository.

Example 14 is the method of Example 13, further comprising: receiving a new set of measurements from a user device; and adding the new set of measurements to the repository.

Example 15 is the method of Example 14, further comprising: performing the new set of measurements on existing waveforms in the repository; and adding results from the new set of measurements to metadata attached to each waveform.

Example 16 is the method of any of Examples 13 through 15, further comprising: receiving signals from a user device; performing at least one task indicated by the signals; and providing results of the task to the user device.

Example 17 is the method of Example 16, wherein the at least one task comprises one or more of searching, sorting, filtering, classifying, triggering, detecting, and predicting.

Example 18 is the method of any of Examples 13 through 17 further comprising using machine learning to classify waveforms in the repository into types of waveforms.

Example 19 is the method of any of Examples 13 through 17 further comprising using machine learning to provide predictions about future measurements on waveforms based upon the metadata.

Example 20 is the method of any of Examples 13 through 19, wherein performing a set of measurements comprises performing at least one of all available measurements, a user-definable set of measurements, and a defined set of measurements after an initial assessment.

Although specific embodiments have been illustrated and described for purposes of illustration, it will be understood that various modifications may be made without departing from the spirit and scope of the disclosure. Accordingly, the invention should not be limited except as by the appended claims.

The invention claimed is:

1. A computing device, comprising:
   a port to allow the computing device to connect to a network; and
   one or more processors, the one or more processors configured to execute code to cause the one or more processors to:
      determine that a new waveform has been added to a repository connected to the computing device;
      perform a set of measurements on the new waveform, including performing one or more of: all available measurements; a user-definable set of measurements; and a defined set of measurements after performing an initial assessment, wherein performing the initial assessment comprises performing at least one of: operating a machine learning process to produce a classification; performing pattern recognition; and basing the initial assessment on one of measurement results, user-defined characteristics, and metadata attached to the new waveform;
      attach results from the measurements to the new waveform as metadata, wherein the metadata further includes administrative information related to acquisition of the new waveform and the results of the set of measurements;
      store the new waveform and attached metadata to the repository;
      update a library of measurements and algorithms based on the set of measurements performed on the new waveform, wherein the library is configured to be dynamically updated to include new measurements and algorithms; and
      crawl historical waveform data already stored in the repository and apply the updated library of measurements and algorithms such that data stored in the repository undergoes all measurements of the updated library and the data stored in the repository is searchable, thereby attaching updated metadata to the historical waveform data.

2. The computing device as claimed in claim 1, wherein the one or more processors are further configured to execute code to cause the one or more processors to:
   receive a new set of measurements across the network from a user device; and
   add the new set of measurements to the repository.

3. The computing device as claimed in claim 2, wherein the one or more processors are further configured to execute code to cause the one or more processors to:
   perform the new set of measurements on existing waveforms in the repository; and
   add results from the new set of measurements to metadata attached to each waveform.

4. The computing device as claimed in claim 1, wherein the one or more processors are further configured to execute code to cause the one or more processors to:
   receive signals from a user device;
   perform at least one task indicated by the signals; and
   provide results of the task to the user device.

5. The computing device as claimed in claim 4, wherein the at least one task comprises one or more of searching, sorting, filtering, classifying, triggering, detecting, and predicting.

6. The computing device as claimed in claim 1, wherein at least one of the one or more processors is configured as part of a machine learning system.

7. The computing device as claimed in claim 6, wherein the machine learning system is configured to classify waveforms in the repository into types of waveforms.

8. The computing device as claimed in claim 6, wherein the machine learning system is configured to provide predictions about future measurements.

9. The computing device as claimed in claim 1, wherein the computing device is connected to one or more test and measurement devices.

10. The computing device as claimed in claim 1, wherein the computing device comprises multiple computing devices and the one or more processors are distributed among the multiple computing devices.

11. A method of managing waveform data, comprising:
    determining that a new waveform has been added to a repository;
    performing a set of measurements on the new waveform, including performing one or more of: all available measurements; a user-definable set of measurements; and a defined set of measurements after performing an initial assessment, wherein performing the initial assessment comprises performing at least one of: operating a machine learning process to produce a classification; performing pattern recognition; and basing the initial assessment on one of measurement results, user-defined characteristics, and metadata attached to the new waveform;
    attaching results from the measurements to the new waveform as metadata, wherein the metadata further includes administrative information related to acquisition of the waveform data and the results of the set of measurements;
    storing the new waveform and attached metadata to the repository;
    updating, by a computing device, a library of measurements and algorithms based on the set of measurements performed on the new waveform, wherein the library is configured to be dynamically updated to include new measurements and algorithms; and
    crawling, by the computing device, historical waveform data stored in the repository to apply the updated library of measurements and algorithms such that data stored in the repository undergoes all measurements of the updated library and the data stored in the repository is searchable, thereby attaching updated metadata to the historical waveform data.

12. The method as claimed in claim 11, further comprising:
    receiving a new set of measurements from a user device; and
    adding the new set of measurements to the repository.

13. The method as claimed in claim 12, further comprising:

performing the new set of measurements on existing waveforms in the repository; and adding results from the new set of measurements to metadata attached to each waveform.

14. The method as claimed in claim 11, further comprising:

receiving signals from a user device;

performing at least one task indicated by the signals; and providing results of the task to the user device.

15. The method as claimed in claim 14, wherein the at least one task comprises one or more of searching, sorting, filtering, classifying, triggering, detecting, and predicting.

16. The method as claimed in claim 11, further comprising using machine learning to classify waveforms in the repository into types of waveforms.

17. The method as claimed in claim 11, further comprising using machine learning to provide predictions about future measurements on waveforms based upon the metadata.

18. The method as claimed in claim 11, wherein a computing device is configured to perform the method and the computing device is connected to one or more test and measurement devices.

19. The method as claimed in claim 18, wherein the computing device comprises multiple computing devices and the one or more processors are distributed among the multiple computing devices.

\* \* \* \* \*